4 Sheets--Sheet 1.

H. A. HOUSE.
Bundling Kindling-Wood and other Substances.

No. 138,026.          Patented April 22, 1873.

Witnesses.          Inventor

4 Sheets--Sheet 2.
H. A. HOUSE.
Bundling Kindling-Wood and other Substances.
No. 138,026. Patented April 22, 1873.
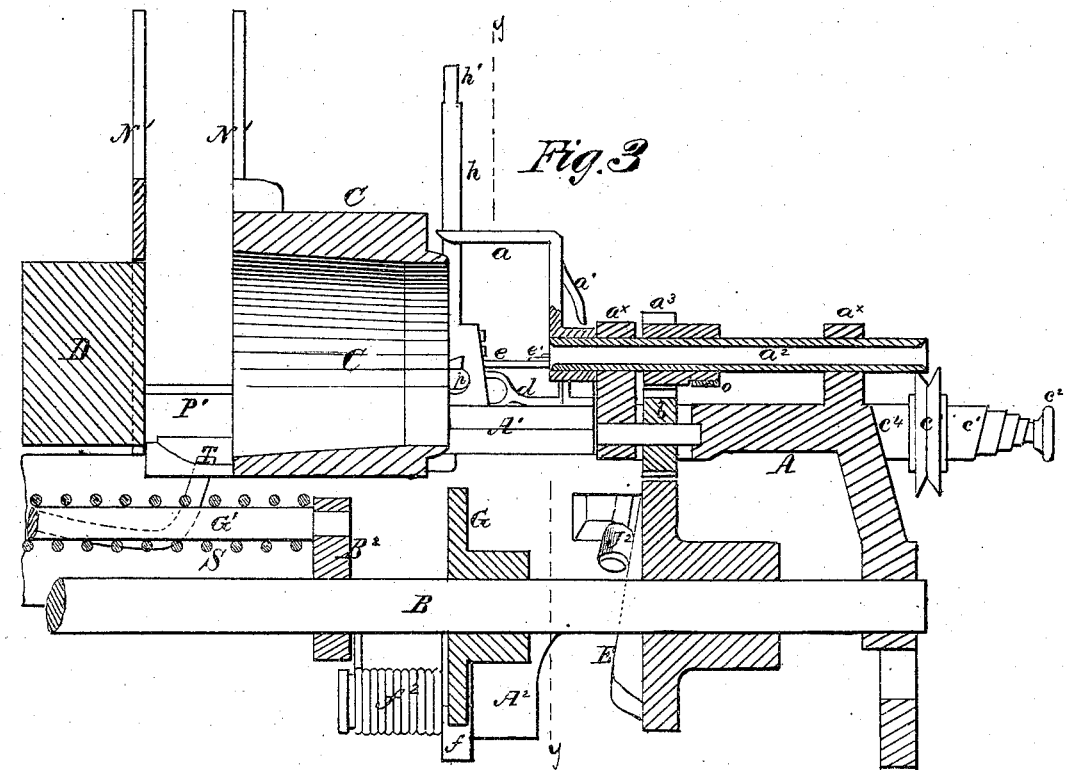
Witnesses
W. Campbell.
J. N. Campbell.
Inventor
H. A. House
by
Munn, Sturich & Stemme 4 Sheets--Sheet 3.
H. A. HOUSE.
Bundling Kindling-Wood and other Substances.
No. 138,026. Patented April 22, 1873.
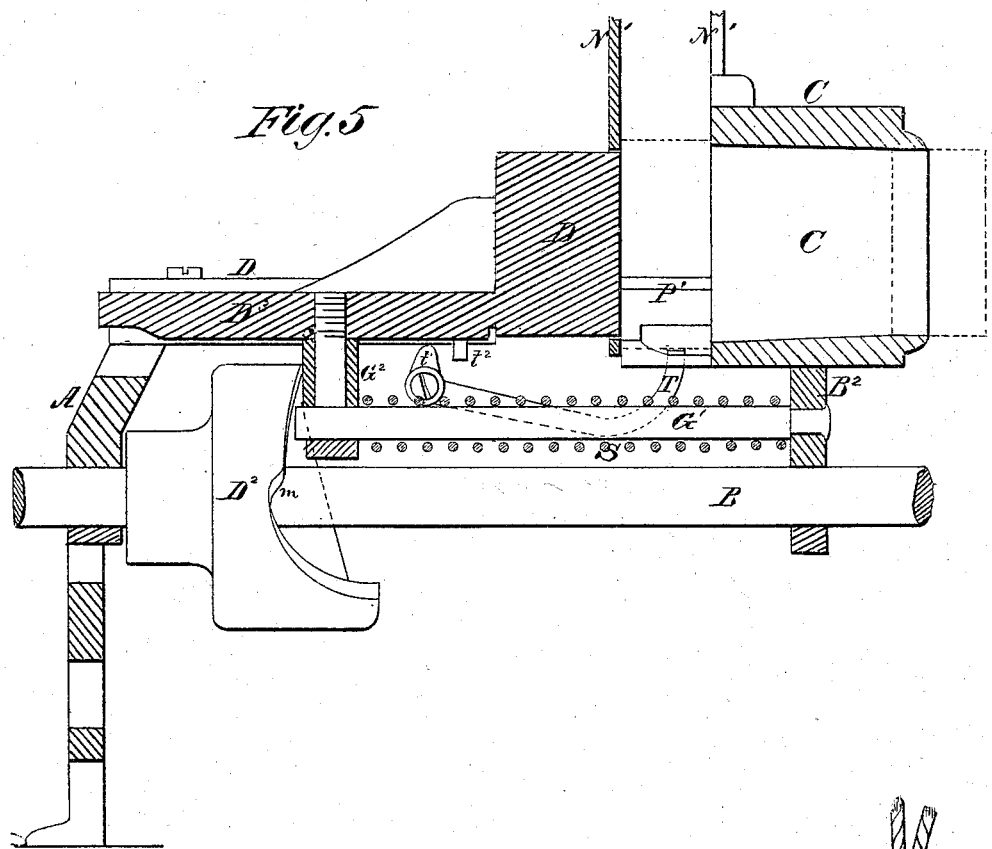
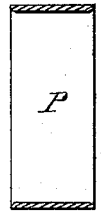
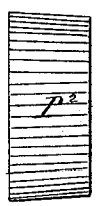
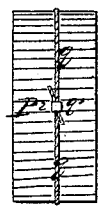
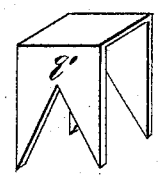
Witnesses.
R. T. Campbell.
J. N. Campbell.
Inventor
H. A. House
by
Mason, Fenwick & Lawrence 4 Sheets--Sheet 4.
H. A. HOUSE.
Bundling Kindling-Wood and other Substances.
No. 138,026. Patented April 22, 1873.
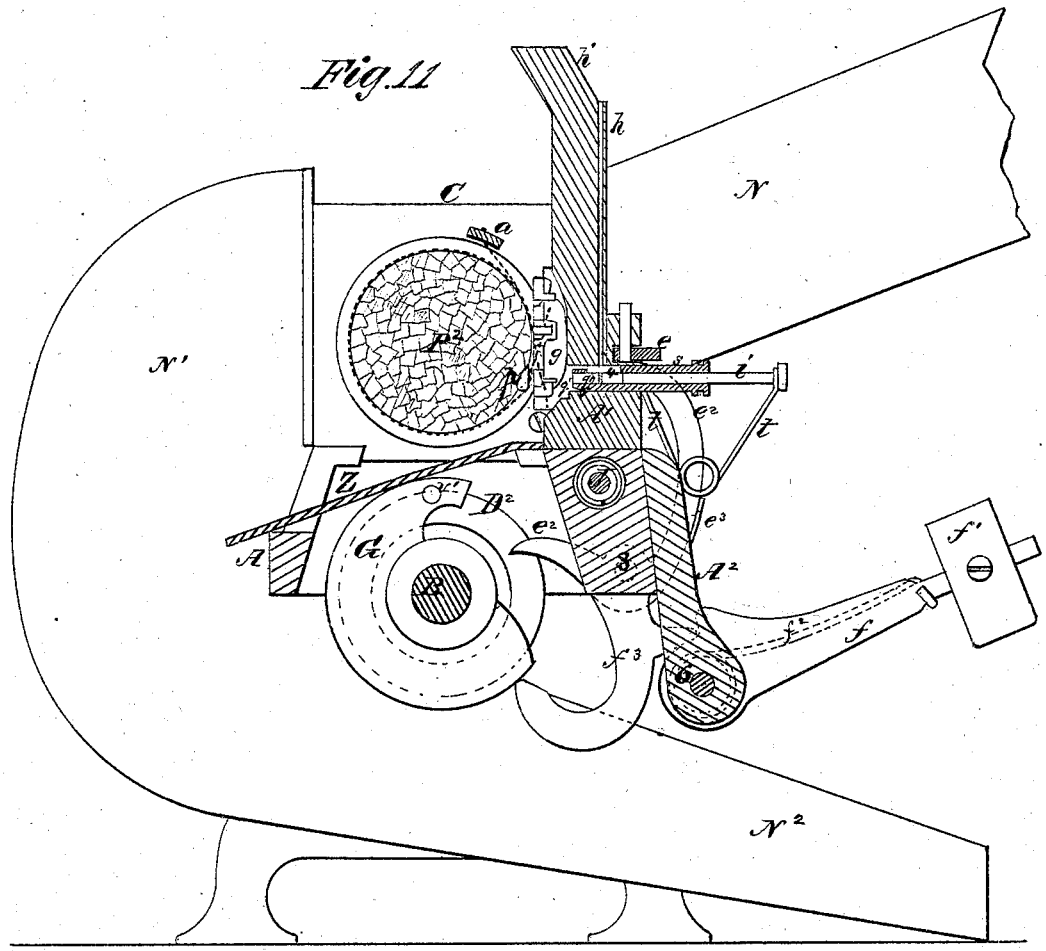
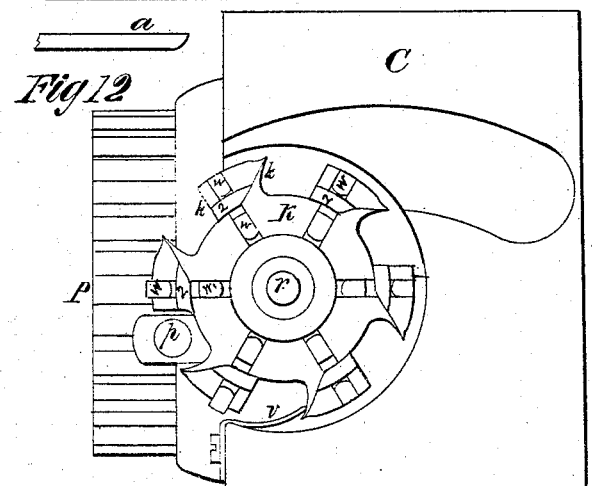
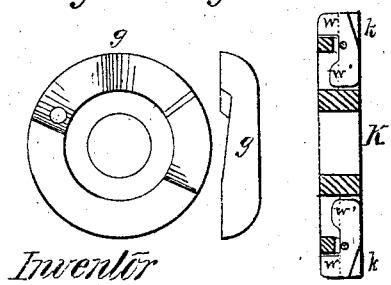
Witnesses: R. Campbell, J. N. Campbell.
Inventor
H. A. House
by
Mason Fenwick & Lawrence

UNITED STATES PATENT OFFICE.

HENRY A. HOUSE, OF BRIDGEPORT, CONNECTICUT.

IMPROVEMENT IN BUNDLING KINDLING-WOOD AND OTHER SUBSTANCES.

Specification forming part of Letters Patent No. 138,026, dated April 22, 1873; application filed December 6, 1872.

CASE B.

*To all whom it may concern:*

Be it known that I, HENRY A. HOUSE, of Bridgeport, in the county of Fairfield and State of Connecticut, have invented certain Improvements in Bundling Kindling-Wood and other Substances; and I do hereby declare that the following is a full, clear, and exact description thereof, reference being had to the accompanying drawing making part of this specification, in which—

Figure 1:
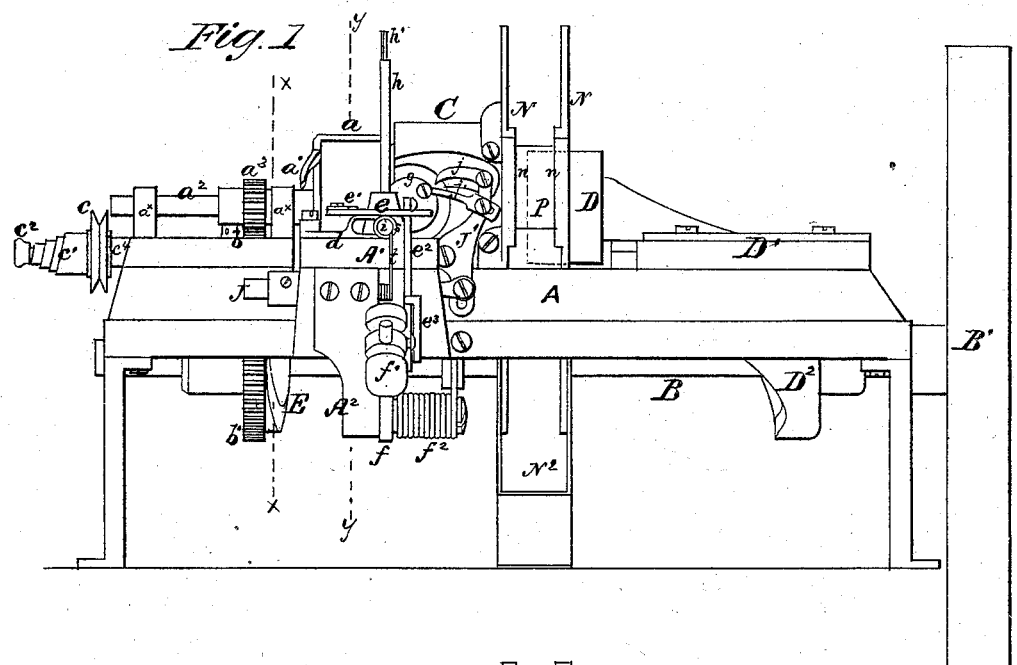
Figure 2:
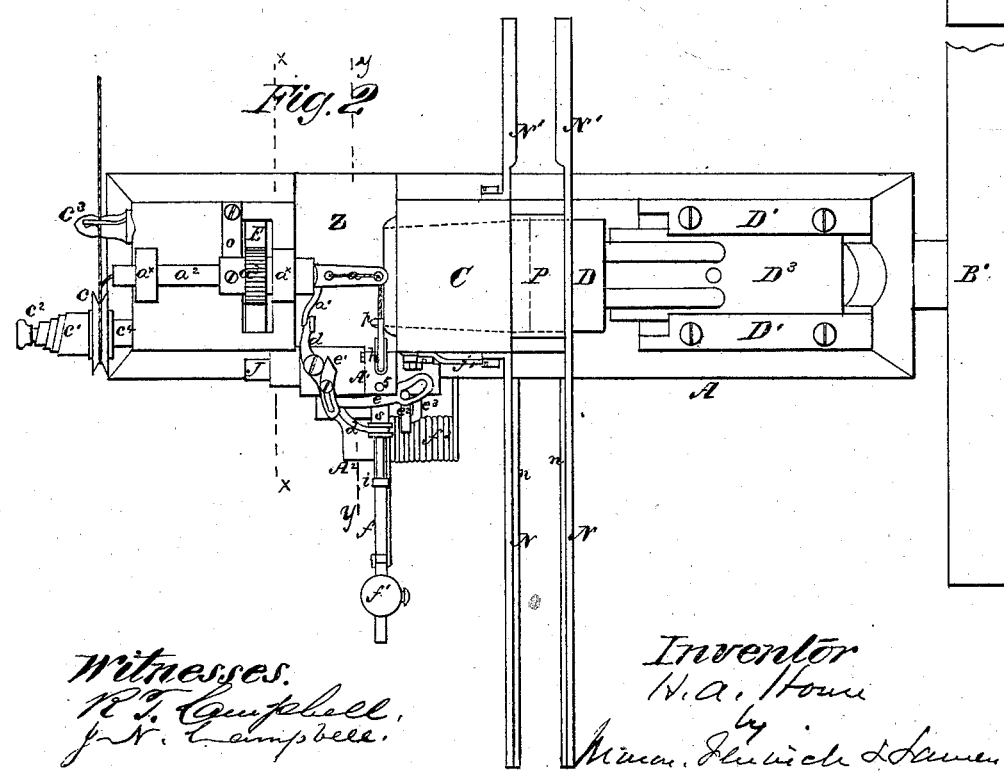

Figure 1, Plate 1, is an elevation of one side of the machine with the griping-jaws for the cord removed. Fig. 2, Plate 2, is a top view of the machine complete. Fig. 3, Plate 2, is a section taken longitudinally and vertically through that part of the machine in which the pressing and binding are performed. Fig. 4, Plate 2, is a section taken vertically and transversely through the machine in the plane indicated by dotted line $x\ x$, Figs. 1 and 2. Fig. 5, Plate 3, is a section taken vertically (except the cam $D^2$) and longitudinally through that part of the machine in which the material is compressed into the hollow tapering box. Figs. 6, 7, 8, Plate 3, represent the successive stages through which the material passes. Fig. 9, Plate 3, shows a fastening-staple. Fig. 10, Plate 3, represents the staple when it is clinched about the end of a band. Fig. 11, Plate 4, is a section taken vertically and transversely through the machine in the plane indicated by the dotted line $y\ y$, Figs. 1, 2, and 3. Fig. 12, Plate 4, is a view in detail, representing one side of the pressing-box with a bundle of compressed material exposed beyond one end of the same, and showing the series of jaws for holding the cord, with the cam-shaped cap removed to expose the tails of said jaws. Figs. 13 and 14, Plate 4, show the circular cam for actuating the jaws, which are shown in Fig. 12, for griping the cord. Fig. 15, Plate 4, shows in diametrical section two of the griping-jaws and their bearing-plate.

Similar letters of reference indicate corresponding parts in the several figures.

This invention relates to certain novel improvements which are designed for compressing wood and other substances in bundles, and binding the bundles, (while under compression,) as will be hereinafter explained.

Before describing the invention which forms the subject of this application, I will here say that I do not claim anything which I have claimed in my applications marked, respectively, Cases A' and C, and the latter bearing even date with the filing of this.

The following description of my invention will enable others skilled in the art to understand it.

In the accompanying drawing, A represents the frame of the machine, which is mounted on legs and supported in a horizontal position. B represents the main driving-shaft, which is supported at its extremities by the ends of the frame A, and on which is applied a driving-wheel, B', a cam, $D^2$, a hammer trip-cam, G, and a cam-wheel, E. D represents a plunger or presser head, which is applied on one end of a slide, $D^3$, which is guided in ways $D^1$ on the top, and at one end of the frame A. This presser-head and its slide receive motion from the cam $D^2$, which acts against an anti-friction stud, $G^2$, that is held against the face of the cam by means of a helical spring, S. The stud $G^2$ receives through it a rod, $G^1$, around which the spring S is coiled. C represents a compressing-chamber; it is of taper form internally, and preferably circular. The taper may extend from end to end of the chamber, or only for a portion of its length. This chamber is rigidly secured upon the frame A, between the plunger and a flier, $a$. That end of the compressing-chamber C into which the material is introduced is about the same diameter as the bore of a forming-gage, P, Fig. 6, which I propose to use with this machine, and in which the material is packed by hand before being placed into the machine, while the opposite end is smaller in diameter. By this construction the material will be compacted while being driven through the chamber. The object of thus compressing the bundles is, that after they are bound and forced out of the chamber C they will expand in their bands, and thus be very tightly held thereby.

As above stated, the material is packed into rings or forming-gages P by hand labor before being introduced into the machine, and, when thus packed, the bundles are placed upon inclined flanges $n\ n$ of guides N N, and roll down on said flanges n n into a concave seat, P', between the presser-head D and the receiving end of the compressing-chamber C, so that when the presser-head advances it will force the material out of the ring P into the said chamber, leaving the ring behind. When the presser-head recedes, and just before it reaches the termination of its back stroke, a portion, $m$, of the cam $D^2$ will allow the spring S to give the plunger and its slide a quick movement, which will cause a stud, $t^2$, on said slide to strike the toe $t^1$ of an ejector, T, and thus throw the empty ring P out of its seat and between two discharging-guides, $N^1 N^1$, which conduct the rings beneath the machine and into a trough, $N^2$, Fig. 1. The filled rings P are thus successively conveyed in front of the plunger, by which they are emptied and then discharged into an inclined trough in a convenient position to be removed and refilled.

During the operation of the machine the bundles are successively exposed half their length beyond the smaller and cylindrical end of the compressing-chamber C, and are thus left until they are bound and the bands fastened.

I will now proceed to describe certain devices for putting on the bands and fastening them: The binding-cord is carried from a reel beneath a tension-spring, $c^3$, Fig. 2, Plate 1; thence passed around a grooved tension-wheel, $c$, which turns on a stud, $c^4$, and which is acted on by a spring, $c^1$, and an adjusting tension-nut, $c^2$. After passing around the wheel $c$ the cord is carried through a hollow shaft, $a^2$, the axis of which coincides with the axis of the compressing-chamber C, as clearly shown in Fig. 3. On the end of shaft $a^2$ next the compressing-tube C is a cranked flier, $a$, through which the cord is also passed, and by the revolution of which the cord is carried around the bundles as they are successively exposed beyond the end of the compressing-chamber C, as indicated in Fig. 11, Plate 4. The hollow shaft $a^2$ is supported by bearings $a^\times a^\times$ on top of frame A, and on this shaft a pinion spur-wheel, $a^3$, is keyed, the hub of which is shouldered and pressed against by a check-spring, $o$, that prevents the said shaft from turning backward during the operation of fastening the ends of the band upon a bundle. The pinion $a^3$ engages with another pinion, $b$, and this latter engages at times with teeth $b'$ on the periphery of the circular face-cam E. There are just a sufficient number of teeth $b'$ to give the flier-arm $a$ one revolution during a revolution of the shaft B, and after every revolution of this flier-arm $a$ it remains at rest until the ends of the cord are fastened around a bundle and another bundle has been brought into position for binding. In connection with the flier-arm $a$ I employ a series of griping-jaws for alternately holding and releasing the cord. These jaws $w$ are shown by Figs. 12 and 15, where it will be seen that they are arranged at equal distances from each other around a circular wheel, K, which wheel, together with a cam-faced plate, $g$, is placed on a stud, $r$, projecting from one side of the compressing-box C. The stud $r$ is so arranged that as the jaws are successively moved in position for holding the cord around a bundle they will be in line with such cord as it leaves the flier-arm $a$. The pivoted jaws $w$ all radiate from the axis $r$, and each one of these jaws is received between lugs $k k'$, its inner end or tail $w'$ being swelled, as shown in Fig. 15. Between the tail and griping portion of each jaw $w$ is a lug, 2, which is formed on wheel K, and against which the cord is held. The lug $k'$ of each jaw is beveled and tapered so that it will guide and direct the cord between the jaw and its lug 2. Above and a little to one side of the wheel K is a pawl, $j$, Fig. 1, Plate 1, which is pivoted to a lever, $J^1$, and which acts against the lugs $k'$, and moves the jaws into position for operation, in which position the wheel K will be held by a check-spring, $v$, beneath this wheel, as shown in Fig. 12. The lever $J^1$ is connected by its lower end to a rod, J, which passes horizontally through an offset of frame A, and has an anti-friction stud, $J^2$, fixed to it and a spring coiled around it. The spring just referred to holds the anti-friction stud $J^2$ against the cam-face of wheel E, the cam on which gives the required movements to the pawl $j$ at the proper time. The circular cam-plate $g$ is allowed to oscillate on the stud $r$, which movement it receives from the lever $J^1$ by means of a slotted connecting-link, $j'$. That face of the cam-plate $g$ which is next the wheel K has depressions and elevations on it for the purpose of actuating the jaws to gripe and release the cord, as will be hereinafter explained. After the cord is carried around a bundle, and while its ends are crossed and held opposite the concave surface of an anvil, $p$, Fig. 11, Plate 4, which is fixed on the end of the compressing-chamber C, these crossed ends are fastened firmly together by means of a staple, $q'$, Fig. 9, Plate 3, the forked ends of which are clinched about them, as shown in Fig. 10, Plate 3, and by means which I shall now describe: $A^1$, Fig. 4, represents a block, which is rigidly secured upon the offset of frame A, and from which rises vertically a staple guide and feeder, $h$; the upper end $h'$ presents an obtuse angle for facilitating the filling of the guide. This guide will be better understood by stating that the passage through it corresponds in cross-section to the rectangular shape of the staple $q'$, the pointed ends of which are all directed toward the anvil $p$. This guide is kept full of the staples, which descend one at a time by their own gravity into a carrier-tube, $s$, which works through the block $A'$ in line with the anvil $p$, and at right angles to the axis of the compressing-chamber C, as clearly shown in Fig. 11, Plate 4. This carrier-tube has a square opening axially through it and an oblong slot leading into it from the lower end of the feeding-guide $h$, so that when the carrier is in the position indicated in Fig.

11 a staple, $q'$, can drop into it. Inside of the carrier-tube $s$ is a clinching-tool, $i$, which is thrown back to the position indicated in Fig. 11 by a spring, $t$. The carrier-tube $s$ is moved up to the anvil $p$ by means of a forked lever, $d$, the forked end of which embraces the carrier between two collars formed on it, and the opposite end of which is acted on by a cam-shaped tail, $a'$, on the flier-arm $a$, as this arm winds the cord upon a bundle. The carrier-tube $s$ is moved away from the anvil to the position indicated in Fig. 11 by the same spring $t$ which withdraws the clinching-tool. A groove in the clinching-tool and a pin which enters therein from the carrier will prevent the complete extraction of the clinching-tool from the latter. When the carrier is brought up to the anvil $p$ and held there by the cam-tail $a'$, the clinching-tool being held in the position shown in Fig. 11, the latter is struck by a hammer, $f^1$, which is adjustably applied on the outer end of an arm, $f$, when it will forcibly drive a staple, $q'$, forward against the anvil $p$ and clinch its ends about the crossed cords. The hammer-arm $f$ is pivoted to a bracket, $A^2$, at 6, and acted on by a spring, $f^2$, which gives the stroke when the hammer-arm is released. On the main shaft B a tripping plate or cam, G, is keyed, and shown in Fig. 11, Plate 4, to which a stud, $v'$, is secured. This plate G performs two offices, to wit: It throws down the hammer $f^1$ to the position shown in Fig. 11 by acting directly on a hooked lever, $f^3$, which in turn reacts against a shoulder near the pivot 8 of said hammer, and then it holds the hammer in said position until the carrier-tube $s$ is brought up against the anvil $p$, when it suddenly releases the lever $f^3$ and hammer-arm $f$, and allows the spring $f^2$ to give the clinching stroke. The pin $v'$ on the plate G actuates a curved lever, $e^2$, which is pivoted at 8, and whose upper end enters a slot in the right-hand end of a lever, $e$. This lever $e$ carries on one end a knife, $e^1$, adjustably connected to it, which is designed for cutting the cord after each staple has been clinched, and thus allowing the bundle, when it is forced out of the compressing-chamber C by the plunger D, to escape from the machine. This operation takes place immediately after a staple is clinched on a band, and just before the plunger D commences to force out the bound bundle and bring another into its place. After the pin $v'$ releases the lever $e^2$ it is caused to return the knife $e^1$ to the position shown in Fig. 2 by a spring, $e^3$, Fig. 11, which spring is attached below to the offset of frame A, which I have above referred to.

Operation.

After having forced two bundles of wood or other material which is equal in length to the length of the rings P into the tapered portion of chamber C, another bundle of the material is brought into the seat P' in line with the plunger D. The operation of compressing now commences by the moving forward of the plunger, which forces the material out of the ring P last brought into the seat P', and drives before it the material first put into the machine, leaving this exposed about half its length beyond the cylindrical discharging end of the chamber C. The plunger then recedes, and just as it is in the act of completing its backward stroke it receives a quick impulse and actuates the discharger T, which throws out the empty ring and allows a filled ring to take its place. While the plunger is receding the flier winds a cord around the partly-exposed bundle above referred to; the clinching-tool is then struck by the hammer, and a staple driven forward and clinched around the cord, after which the knife $e^1$ is moved around, and the cord severed thereby. At the next forward stroke of the plunger the bound bundle is discharged from the machine over an incline-table, Z, and an unbound bundle is brought into position for binding. It is necessary that the cord should be firmly held both above and below the anvil $p$ while applying the staple-fastening and severing it. This is done by the jaws on the intermittent-rotating wheel K, which jaws are closed on the cord after they are successively brought into position to receive it by the cam-plate $g$, which latter receives an oscillating motion on the stud $r$ and releases the jaws at the proper times.

It will be seen from the above description and by reference to the drawing that the chamber C inside of the compressing-tube is not tapered from end to end, but that one portion of it is cylindrical, to wit, that portion of it which retains one-half, more or less, of the bundle of material which is exposed for binding. The bundle will therefore be held when compressed and exposed half its length beyond the smaller end of the press-box in a cylindrical condition, in which condition it is bound and the band clinched before it is discharged upon the inclined table Z, which finally guides the bundles out of the machine.

Having described my invention, what I claim as new, and desire to secure by Letters Patent, is—

1. The gage-seat P', in combination with a charging-gage, P, which is open at both ends, and a tubular compressing-chamber C, which opens into said seat, substantially as and for the purpose described.

2. The inclined feeding-guides N, combined with the tubular compressing-chamber C and gage-seat P', substantially as described.

3. The ring-discharger T, arranged below the bed, and under the perforated seat P', in combination with the plunger D, chamber C, and guides $N^1 N^1$, substantially as and for the purpose described.

4. The combination of the chamber C, plunger or pressing head D, wrapping devices, and clinching devices, substantially as and for the purposes specified.

5. The combination of the wrapping devices, the clinching devices, and a cutter, $e^1$, as herein described, with a chamber, C, substantially as specified.

6. The combination of the tension devices $c\ c^3$ and a wrapping device, $a$, with the tapered compressing-chamber C, substantially as described.

7. The chamber C, in combination with the wrapping and clinching devices, substantially as described.

8. The flier-arm $a$, in combination with the chamber C, and the plunger D, and devices for crossing and holding the cord, substantially as described.

9. The inclined chute or guide $N^2$, in combination with the gage-seat P, for conveying the empty ring-gages back to the filling-boxes, substantially as described.

10. The combination of the wrapping mechanism, the clinching mechanism, and the compressing mechanism, shaft B, cams $D^2$ E, and tripping-plate G, all substantially as set forth.

HENRY A. HOUSE.

Witnesses:
JAMES N. CAMPBELL,
JAMES MARTIN, Jr.